United States Patent [19]

Blizzard et al.

[11] Patent Number: 4,584,355
[45] Date of Patent: Apr. 22, 1986

[54] SILICONE PRESSURE-SENSITIVE ADHESIVE PROCESS AND PRODUCT WITH IMPROVED LAP-SHEAR STABILITY-I

[75] Inventors: John D. Blizzard, Bay City; Dipak Narula, Midland, both of Mich.

[73] Assignee: Dow Corning Corporation, Midland, Mich.

[21] Appl. No.: 665,805

[22] Filed: Oct. 29, 1984

[51] Int. Cl.$^4$ ............................................. C08L 83/06
[52] U.S. Cl. .................... 525/477; 524/500; 524/588; 525/478; 528/34
[58] Field of Search ................. 525/477, 478; 528/34; 524/500, 588

[56] References Cited

U.S. PATENT DOCUMENTS

| | | | |
|---|---|---|---|
| 2,736,721 | 2/1956 | Dexter | 260/42 |
| 2,814,601 | 11/1957 | Currie et al. | 260/29.1 |
| 2,857,356 | 10/1958 | Goodwin | 260/42 |
| 3,528,940 | 9/1970 | Modic | 260/37 |
| 3,929,704 | 12/1975 | Horning | 260/29.1 SB |
| 3,983,298 | 9/1976 | Hahn et al. | 428/355 |
| 4,255,316 | 3/1981 | Blizzard | 260/37 SB |
| 4,309,520 | 1/1982 | Blizzard | 525/477 |
| 4,374,950 | 2/1983 | Shimizu | 528/34 |
| 4,417,042 | 11/1983 | Dziark | 528/34 |

FOREIGN PATENT DOCUMENTS 575664 5/1959 Canada .
711756 6/1965 Canada .

Primary Examiner—Wilbert J. Briggs, Sr.
Attorney, Agent, or Firm—Richard E. Rakoczy

[57] ABSTRACT

This invention relates to silicone pressure-sensitive adhesives having improved viscosity stability, film physical property stability upon aging and lap shear stability (hold time) made by a method comprising the condensation of a benzene-soluble resin copolymer of 0.6 to 0.9 triorganosiloxy units per $SiO_{4/2}$ unit which contains silicon-bonded hydroxyl radicals and a polydiorganosiloxane preferably containing silicon-bonded hydroxyl or other hydrolyzable endblocking radicals with a sufficient amount of an ammonia releasing endblocking agent containing endblocking triorganosilyl units such as hexamethyldisilazane to result in a 1:0.8 to 1:3 mole ratio of silicon-bonded hydroxyl radicals and hydrolyzable endblocking radicals to total moles of triorganosilyl units provided by the endblocking agent. The condensation is conducted with heating at 80° C.–160° C. in the presence of 0.5 to 10 moles of water per mole of $=NH$ present in the endblocking agent and, when necessary, in the presence of an effective amount of an organic solvent such as xylene. Condensation is preferably conducted under solvent reflux conditions. When the condensation reaction is substantially complete, the remaining endblocking agent, water and ammonia released by the endblocking agent is stripped from the composition.

36 Claims, No Drawings

SILICONE PRESSURE-SENSITIVE ADHESIVE PROCESS AND PRODUCT WITH IMPROVED LAP-SHEAR STABILITY-I

BACKGROUND OF THE INVENTION

This invention relates to a method of improving the lap shear stability of a silicone pressure-sensitive adhesive composition produced by a method involving endblocking the residual silanol groups present in the composition with triorganosilyl units derived from triorganosilazanes and/or triorganosilylamines by including an amount of water in the reaction mixture during the endblocking reaction. This invention also relates to the silicone pressure-sensitive adhesives obtained through the use of that method.

In a U.S. patent application Ser. No. 06/665,797 entitled "Silicone Pressure-Sensitive Adhesive Process and Product Thereof" which is being filed concurrently herewith and assigned to the same assignee as the present invention (hereby incorporated by reference), John D. Blizzard and Terence J. Swihart teach an improved method of making a silicone pressure-sensitive adhesive by (I) mixing (A) a silanol-containing copolymer resin of 0.6 to 0.9 triorganosiloxy units per $SiO_{4/2}$ unit, (B) a polydiorganosiloxane, preferably one containing endblocking X radicals such as silanol or other hydrolyzable radicals, (C) a sufficient amount of an endblocking agent capable of providing endblocking triorganosilyl units such as hexamethyldisilazane or trimethylmethoxysilane to result in units such as hexamethyldisilazane or trimethylmethoxysilane to result in a 1:0.8 to a 1:0.8 to 1:3 mole ratio of total moles of silicon-bonded hydroxyl radicals and hydrolyzable endblocking radicals to total moles of triorganosilyl units provided by the endblocking agent, (D) when desirable, a catalytic amount of a mild silanol condensation catalyst if one is not otherwise generated by (C), and (E), when necessary, an effective amount of an organic solvent to reduce the viscosity of the mixture of (A), (B), (C) and (D), and (II) condensing the mixture of (A), (B), (C) and (D) at least until a substantial amount of the endblocking triorganosilyl units have reacted with the silicon-bonded hydroxyl and hydrolyzable X radicals of said (A) and (B), and more preferably, at least until the rate of evolution of condensation by-products is substantially constant and the desired adhesive physical property profile is obtained. Condensation is preferably conducted with heating under solvent reflux conditions. After the condensation is complete, a solvent and/or other ingredients can be added to complete the production of the silicone pressure-sensitive adhesive.

As a result of the simultaneous condensation and endblocking of the resin copolymer and polydiorganosiloxane, the silanol content of the silicone pressure-sensitive adhesive product is reduced to a minimum thereby improving the viscosity stability and physical property stability upon aging of the resulting silicone pressure-sensitive adhesive. A further advantage of the Blizzard and Swihart invention is that the physical properties of the resulting silicone pressure-sensitive adhesive such as tack or adhesion can be modified by changing the level of endblocking agent and/or the type of endblocking agent employed.

As noted in Example 11 of the Blizzard and Swihart Application, the hold time (an accelerated test to measure of lap shear stability which is more fully described, infra) of silicone pressure-sensitive adhesives made using endblocking agents which release ammonia (i.e., organosilazanes) were low relative to other silicone pressure-sensitive adhesive compositions tested. This reduced hold time was thought to be due to the presence of ammonia in the composition. As described in Example 12 of my application with Terence Swihart, (see Examples 1B and 2A of this Application), we conceived the idea and showed that it was possible to increase the hold time by adding a small amount of water either before or during processing of the pressure-sensitive adhesive composition. Compositions made using alkoxysilanes which are free of ammonia exhibited excellent resistance to creep (high temperature lap shear stability) and would therefore be expected to exhibit improved hold times. It is desirable to have as long of a hold time as possible where the pressure-sensitive adhesive composition is to be used to adhere an object to a vertical surface or where the composition is used on a pressure-sensitive adhesive tape which will be exposed to stress or heat during use.

SUMMARY OF THE INVENTION

It is the primary object of the present invention to improve the lap shear stability (i.e., the hold time) of silicone pressure-sensitive adhesives made by the aforementioned Blizzard and Swihart process when endblocking agents releasing ammonia are employed in that process.

It is another object of the present invention to provide a method of making a silicone pressure-sensitive adhesive composition which has improved viscosity stability and film physical property stability upon aging as compared with cold blends of silicon-bonded hydroxyl radical containing ("silanol-containing") silicone copolymer resins of triorganosiloxy units and $SiO_{4/2}$ units with polydiorganosiloxanes having silanol or hydrolyzable endblocking radicals.

These and other objects of the present invention are provided by a method of making a silicone pressure-sensitive adhesive by (I) mixing (A) a silanol-containing copolymer resin of 0.6 to 0.9 triorganosiloxy units per $SiO_{4/2}$ unit, (B) a polydiorganosiloxane, preferably one containing endblocking X radicals such as silanol or other hydrolyzable radicals, (C) a sufficient amount of an endblocking agent capable of providing endblocking triorganosilyl units and releasing ammonia upon reaction of said endblocking triorganosilyl units such as hexamethyldisilazane to result in a 1:0.8 to 1:3 mole ratio of total moles of silicon-bonded hydroxyl radicals and hydrolyzable endblocking radicals to total moles of triorganosilyl units provided by the endblocking agent, (D) from 0.5 to 10 moles of water per mole of =NH provided by said (C) and (E), when necessary, an effective amount of an organic solvent such as xylene to reduce the viscosity of the mixture of (A), (B) and (C), (II) condensing (A), (B) and (C) at a temperature of from 80° C. to 160° C. and at the same time at least periodically removing any condensation by-products from the mixture at least until a substantial amount of the triorganosilyl units have reacted with the silicon-bonded hydroxyl radicals and X radicals of said (A) and (B), and (III) stripping substantially any remaining condensation by-products, and (D) from the mixture after the condensation reaction of step (II) is substantially complete. Step (II) is more preferably conducted until the rate of evolution of condensation by-products is substantially constant and the desired physical property profile is obtained. Stripping of the water (D) results in better removal of residual ammonia from the product and thereby improves the lap shear stability (hold time) of the resulting product. After the condensation and stripping are complete, a solvent and/or other ingredients can be added to complete the production of the silicone pressure-sensitive adhesive composition.

As a result of the simultaneous condensation and endblocking of the resin copolymer and polydiorganosiloxane, the silanol content of the silicone pressure-sensitive adhesive product is reduced to a minumum thereby improving the viscosity stability and physical property stability upon aging of the resulting silicone pressure-sensitive adhesive. A further advantage of the present invention is that the physical properties of the resulting silicone pressure sensitive adhesive such as tack or adhesion can be modified by changing the level of endblocking agent and/or the type of endblocking agent employed.

DETAILED DESCRIPTION OF THE INVENTION

This invention relates to a method of making a silicone pressure-sensitive adhesive composition having improved lap shear stability which consists essentially of the steps of:

(I) mixing
  (A) from 40 to 70 inclusive parts by weight of at least one benzene-soluble resin copolymer containing silicon-bonded hydroxyl radicals and consisting essentially of $R_3SiO_{1/2}$ units and $SiO_{4/2}$ units in a mole ratio of from 0.6 to 0.9 $R_3SiO_{1/2}$ units for each $SiO_{4/2}$ unit present,
  (B) from 30 to 60 parts by weight of at least one polydiorganosiloxane consisting essentially of ARSiO units terminated with endblocking $TRASiO_{1/2}$ units, each said polydiorganosiloxane having a viscosity of from 100 centipoise to 30,000,000 centipoise at 25° C., and each T is R— or X—,
  (C) a sufficient amount of at least one organosilicon endblocking agent capable of generating an endblocking triorganosilyl unit of the formula $ZR_2Si$— to provide a 1:0.8 to 1:3 mole ratio of total silicon-bonded hydroxyl and X radicals present in said (A) and (B) to total endblocking triorganosilyl units provided by all endblocking agent present, said agent being selected from the group consisting of $ZR_2SiNH_2$ and $(ZR_2Si)_2NH$,
  (D) from 0.5 to 10 moles of water per mole of =NH provided by said (C), and
  (E) when necessary, an effective amount of an organic solvent which is inert with respect to (A), (B), (C), and (D) to reduce the viscosity of a mixture of (A), (B), and (C),
(II) condensing (A), (B) and (C) at a temperature of from 80° C. to 160° C. and at the same time at least periodically removing any condensation by-products from the mixture at least until a substantial amount of the endblocking triorganosilyl units have reacted with the silicon-bonded hydroxyl radicals and X radicals of said (A) and (B), and
(III) stripping substantially any remaining condensation by-products and (D) from the mixture after the condensation reaction of step II is substantially complete, wherein each R is a monovalent organic radical selected from the group consisting of hydrocarbon radicals of from 1 to 6 inclusive carbon atoms, each X radical is selected from the group consisting of HO—, H— and R'O— radicals, each R' is an alkyl radical of from 1 to 4 inclusive carbon atoms, each A radical is selected from the group consisting of R— and halohydrocarbon radicals of from 1 to 6 inclusive carbon atoms, each Z radical is A— or QR"—, each R" is a divalent alkylene radical of from 1 to 6 inclusive carbon atoms, each Q is an organofunctional monovalent radical selected from the group consisting of RCOE'—, RE'OC—, NC—, R'E'—, HO—, $G_2N$—, $HO(R''O)_n$— and $G_2NCH_2CH_2NG$— where E' is —O—, —NH— or —S—, where n has a value of from 1 to 6 and each G is R'— or H—.

This invention also relates to the pressure-sensitive adhesive compositions obtained in accordance with that method.

The pressure-sensitive adhesive compositions are made in accordance with the present invention using from 40 to 70 inclusive parts by weight of silicone copolymer resins (A) and from 30 to 60 parts by weight of polydiorganosiloxanes (B) of the type which have been used in the past to make such compositions. More preferred are compositions employing from 45 to 60 parts by weight of resin copolymer (A) and from 40 to 55 parts by weight of polydiorganosiloxane (B).

The benzene-soluble silicone resin copolymers (A) are well-known materials. They contain silicon-bonded hydroxyl radicals in amounts which typically range from about 1 to 4 weight percent of silicon-bonded hydroxyl radicals and consist essentially of $R_3SiO_{\frac{1}{2}}$ units and $SiO_{4/2}$ units in a mole ratio of from 0.6 to 0.9 $R_3Si_{\frac{1}{2}}$ units for each $SiO_{4/2}$ unit present. Blends of two or more such copolymers may also be used. To be useful in the method of this invention, there should be at least some, and preferably at least 0.5%, silicon-bonded hydroxyl content to enable the polydiorganosiloxane component to copolymerize with the copolymer resin and/or to react with the endblocking agent being added. These resin copolymers are benzene-soluble resinous materials which are typically solids at room temperature and are prepared as, and usually, but not necessariy used as, a solution in an organic solvent. Typical organic solvents used to dissolve resin copolymer (A) include benzene, toluene, xylene, methylene chloride, perchloroethylene, naphtha mineral spirits and mixtures of these.

Resin copolymer (A) consists essentially of from 0.6 to 0.9 $R_3SiO_{\frac{1}{2}}$ units for every $SiO_{4/2}$ unit in the copolymer. There may also be a few mole percent of $R_2SiO$ units present in the copolymer provided that the presence of such units does not cause the ultimate product of the process of this invention to lose its ability to function as a pressure-sensitive adhesive. Each R denotes, independently, a monovalent hydrocarbon radical having from 1 to 6 inclusive carbon atoms such as methyl, ethyl, propyl, isopropyl, hexyl, cyclohexyl, vinyl, allyl, propenyl and phenyl. Preferably, the $R_3SiO_{\frac{1}{2}}$ units are $Me_2R'''SiO_{\frac{1}{2}}$ units wherein is R''' is a methyl ("Me") vinyl ("Vi") or phenyl ("Ph") radical. More preferably, no more than 10 mole percent of the $R_3SiO_{\frac{1}{2}}$ units present in resin copolymer (A) are $Me_2R''''SiO$ units and the remaining units are $Me_3SiO_{\frac{1}{2}}$ units where each R'''' is a methyl or a vinyl radical.

The mole ratio of $R_3SiO_{\frac{1}{2}}$ and $SiO_{4/2}$ units can be determined simply from a knowledge of the identity of the R radicals in the $R_3SiO$ units and the percent carbon analysis of the resin copolymer. In the preferred resin copolymer consisting of from 0.6 to 0.9 $Me_3SiO_{\frac{1}{2}}$ units for every $SiO_{4/2}$ unit, the carbon analysis has a value of from 19.8 to 24.4 percent by weight.

Resin copolymer (A) may be prepared according to Daudt et al., U.S. Pat. No. 2,676,182 (issued 4/20/54 and hereby incorporated by reference) whereby a silica hydrosol is treated at a low pH with a source of $R_3SiO_{\frac{1}{2}}$ units such as a hexaorganodisiloxane such as $Me_3Si\text{-}OSiMe_3$, $ViMe_2SiOSiMe_2Vi$ or $MeViPhSiOSiPhViMe$ or triorganosilane such as $Me_3SiCl$, $Me_2ViSiCl$ or $MeViPhSiCl$. Such copolymer resins are typically made such that the copolymer resin contains about 1 to 4 weight percent of silicon-bonded hydroxyl radicals. Alternatively, a mixture of suitable hydrolyzable silanes free of R radicals may be cohydrolyzed and condensed. In this alternative procedure, it is a typical practice to further treat the copolymer product with a suitable silylating agent, such as hexamethyldisilazine or divinyltetramethyldisilazane, to reduce the silicon-bonded hydroxyl content of the copolymer product to less that 1 percent by weight. This step would not be necessary, but could be used, in the process of the present invention. Preferably, the resin copolymers employed contain from about 1 to 4 weight percent of silicon-bonded hydroxyl radicals.

Ingredient (B) is also a well-known material and is one or more polydiorganosiloxanes consisting essentially of ARSiO units terminated with endblocking $TRASiO_{\frac{1}{2}}$ units, each of which polydiorganosiloxanes has a viscosity of from 100 centipoise to 30,000,000 centipoise at 25° C. (100 millipascal-seconds to 30,000 pascal seconds (Pa.s) where 1 centipoise equals 1 millipascal second). As is well-known, viscosity is directly related to the average number of diorganosiloxane units present for a series of polydiorganosiloxanes of varying molecular weights which have the same endblocking units. Polydiorganosiloxanes having a viscosity of from about 100 to 100,000 centipoise at 25° C. range from fluids to somewhat viscous polymers. These polydiorganosiloxanes are preferably prereacted with resin copolymer (A) prior to condensation in the presence of endblocking agent (C) to improve the tack and adhesion properties of the resulting pressure-sensitive adhesive as will be further described. Polydiorganosiloxanes having viscosities in excess of 100,000 centipoise can typically be subjected to the condensation/endblocking step (II) of the present invention without prereaction. Polydiorganosiloxanes having viscosities in excess of 1,000,000 centipoise are highly viscous products often referred to as gums and the viscosity is often expressed in terms of a Williams Plasticity value (polydimethylsiloxane gums of about 10,000,000 centipoise viscosity typically have a Williams Plasticity Value of about 50 mils (1.27 mm) or more at 25° C.).

The polydiorganosiloxanes of (B) consist essentially of ARSiO units where each R is as defined above. Each A radical is selected from radicals such as R— or halohydrocarbon radicals of from 1 to 6 inclusive carbon atoms such a chloromethyl, chloropropyl, 1-chloro,-2-methylpropyl, 3,3,3,-trifluoropropyl and $F_3C(CH_2)_5$— radicals. Thus the polydiorganosiloxane can contain $Me_2SiO$ units, $PhMeSiO$ units, $MeViSiO$ units, $Ph_2SiO$ units, methylethylsiloxy units 3,3,3-trifluoropropyl units and 1-chloro,-2-methylpropyl units and the like. Preferably, the ARSiO units are selected from the group consisting of $R'''_2SiO$ units, $Ph_2SiO$ units and combinations of both where $R'''$ is as above, at least 50 mole percent of the $R'''$ radicals present in the polydiorganosiloxane (B) are methyl radicals and no more than 50 mole percent of the total moles of ARSiO units present in each polydiorganosiloxane of (B) are $Ph_2SiO$ units. More preferably, no more than 10 mole percent of the ARSiO units present in each polydiorganosiloxane (B) are $MeR''''SiO$ units where $R''''$ is as above defined and the remaining ARSiO units present in each polydiorganosiloxane are $Me_2SiO$ units.

Each polydiorganosiloxane (B) is terminated with endblocking units of the unit formula $TRASiO_{\frac{1}{2}}$ where R and A are as defined above and each T radical is R or X wherein each X radical is selected from the group consisting of HO—, H— and R'O— radicals where each R' is an alkyl radical of from 1 to 4 inclusive carbon atoms such as methyl, ethyl, n-propyl, and isobutyl radicals. The X radicals provide a site for reaction with the endblocking triorganosilyl units of ingredient (C) and also provide a site for condensation with other X radicals on polydiorganosiloxanes (B) or with the silicon-bonded hydroxyl groups present in resin copolymer (A). Use of polydiorganosiloxanes where T is HO— is most preferred because the polydiorganosiloxane (B) can then readily copolymerize with the resin copolymer (A). Since ammonia which is generated when the endblocking agents used in this invention react with silicon-bonded hydroxyl radicals, triorganosiloxy (e.g., $R_3SiO_{\frac{1}{2}}$ such as $(CH_3)_3SiO_{\frac{1}{2}}$ or $CH_2=CH(CH_3)_2SiO_{\frac{1}{2}}$ ) unit terminated polydiorganosiloxanes can be employed because some of the triorganosiloxy units can be cleaved in the presence of the ammonia catalyst when the condensation reaction is conducted with heating. The cleavage exposes a silicon-bonded hydroxyl radical which can then condense with silicon-bonded hydroxyl radicals in the copolymer resin, with endblocking triorganosilyl units or with other polydiorganosiloxanes containing X radicals or silicon-bonded hydroxyl radicals exposed by cleavage reactions. Mixtures of polydiorganosiloxanes containing different substituent radicals may also be used.

Methods for the manufacture of such polydiorganosiloxanes are well known as exemplified by the following U.S. Pat. Nos.: 2,490,357 (Hyde); 2,542,334 (Hyde); 2,927,907 (Polmanteer); 3,002,951 (Johannson); 3,161,614 (Brown, et al.); 3,186,967 (Nitzche, et al.); 3,509,191 ((Atwell) and 3,697,473 (Polmanteer, et al.) which are hereby incorporated by reference.

To obtain pressure-sensitive adhesives which are to be cured by peroxide or through aliphatically unsaturated radicals present in resin copolymer (A) or polydiorganosiloxane (B), if resin copolymer (A) contains aliphatically unsaturated radicals, then polydiorganosiloxane (B) should be free of such radicals and viceversa. If both components contain aliphatically unsaturated radicals, curing through such radicals can result in products which do not act as pressure-sensitive adhesives.

In the process of the present invention, the condensation of resin copolymer (A) and polydiorganosiloxane (B) is conducted in the presence of at least one organosilicon endblocking agent (C) capable of generating an endblocking triorganosilyl unit of the formula $ZR_2Si$—. The endblocking agent capable of providing such a triorganosilyl unit is selected from the group consisting of $ZR_2SiNH_2$ and $(ZR_2Si)_2NH$ where R is as previously defined and each G is R'— or H—. Preferably, the endblocking agent is of the formula $(AR_2Si)_2NH$ and each R present in the endblocking agent is a methyl or a phenyl radical.

Each Z radical is selected from radicals such as A— and QR"— radicals where A is as previously defined and R" is a divalent alkylene radical of from 1 to 6 inclusive carbon atoms such as ethylene, propylene, 2-methylpropylene, butylene and hexylene.

Each Q is a monovalent organofunctional radical which is useful in altering the physical properties of the pressure-sensitive adhesive film. Preferably, the Q radical does not condense with the silanol radicals present in the resin copolymer (A) and/or with the X radicals present in polydiorganosiloxane (B) during the condensation step (II) of the present invention. Q can be a monovalent radical selected from the group consisting of RCOE'— where E' is —O—, —NH— or —S— such as RCOO— such as $CH_3COO$—, $CH_2=CCH_3COO$—, and $CH_3(CH_2)_3COO$—, RCONH— such as $CH_3CONH$—, and RCOS— such as $CH_3CH_2COS$—, RE'OC— such as $C_2H_5OOC$—, $CH_3CH_2CH_2OH_2N$-HOC— and $CH_3CH_2CH_2SOC$—, cyano which is NC—, HO—, R'E' such as $CH_3CH_2CH_2O$— and R'S— such as $CH_3CH_2CH_2S$—, and $G_2N$— such as $H_2N$— and $C_2H_5NH$—, and $HO(R"O)_n$— where n has a value of from 1 to 6 such as $HOCH_2CH_2O$— and $G_2NCH_2CH_2NG$— such as $H_2NCH_2CH_2NH$—.

Preferably, Z is selected from the group consisting of methyl, vinyl and 3,3,3-trifluoropropyl radicals and more preferably is a methyl or vinyl radical.

Endblocking agents capable of providing endblocking triorganosilyl units are commonly employed as silylating agents and a wide variety of such agents are known. A single endblocking agent such as hexamethyldisilazane can be employed or a mixture of such agents such as hexamethyldisilazane and sym-tetramethyldivinyldisilazane can be employed to vary the physical properties of the pressure-sensitive adhesive film. For example, use of an endblocking agent containing fluorinated triorganosilyl units such as $[(CF_3CH_2CH_2)Me_2Si]_2NH$ in the process of the present invention could result in a silicone pressure-sensitive adhesive having improved resistance to hydrocarbon solvents after the film is deposited and the presence of the fluorinated triorganosilyl units could affect the tack and adhesion properties of the pressure-sensitive adhesive when the R radicals present in the resin copolymer (A) and the polydiorganosiloxane (B) are substantially composed of methyl radicals. By employing endblocking agents containing higher carbon content silicon-bonded organic radicals such as ethyl, propyl or hexyl radicals, the compatibility of the silicone pressure-sensitive adhesive with organic pressure-sensitive adhesives could be improved to allow blending of such adhesives to obtain improved adhesive compositions. Use of endblocking agents having triorganosilyl units having organofunctional radicals such as amides, esters, ethers and cyano radicals could allow one to change the release properties of a pressure-sensitive adhesive made in accordance with the present invention. Such organofunctional radicals, particularly amino-functional radicals, may not be desirable when optimum lap shear stability is desired. Likewise, organofunctional radicals present in the pressure-sensitive adhesive composition can be altered such as by hydrolyzing ROOCR"— radicals to generate HOOCR"— radicals which are converted to MOOCR" radicals where M is a metal cation such as lithium, potassium or sodium. The resulting composition may then exhibit release or other properties different from a composition containing RCOOR"— radicals.

Use of endblocking agents containing triorganosilyl units with unsaturated organic radicals such as vinyl can produce silicone pressure-sensitive adhesives which can be cross-linked through such groups. For example, an organosilicon cross-linking compound containing silicon-bonded hydrogen radicals can be added along with a noble metal such as a platinum metal or rhodium metal catalyst to a silicone pressure-sensitive adhesive composition made in accordance with the present invention which contains PhMeViSi— and $Me_3Si$— endblocking triorganosilyl units to produce a pressure-sensitive adhesive composition which cures via the platinum catalyzed addition of silicon-bonded hydrogen radicals to silicon-bonded vinyl radicals. Use of endblocking agents containing triorganosilyl units with phenyl radicals could improve the stability of the pressure-sensitive adhesive to heat.

Thus, the endblocking agent serves several purposes in the present invention because it removes silicon-bonded hydroxyl radicals which can affect the viscosity and physical property stability of the resulting pressure sensitive adhesive, it enables one to modify the properties of the adhesive without making substantial changes in the resin copolymer and polydiorganosiloxanes and by selecting an appropriate level of endblocking agent, one can alter the molecular weight of the condensation product of the resin copolymer (A) and polydiorganosiloxane (B) since the triorganosilyl units act as endblocking units.

In order to achieve the primary objective of the present invention, one must add at least a sufficient amount of one or more endblocking agents to provide at least a 0.8:1 mole ratio of total endblocking triorganosilyl units to total silicon-bonded hydroxyl radicals present in resin copolymer (A) and polydiorganosiloxane (B). A 1:1 ratio may not always be necessary since condensation between the resin copolymer (A) and polydiorganosiloxane (B) also effectively removes silicon-bonded hydroxyl radicals. The resin copolymer (A) will typically contain the majority of the silicon-bonded hydroxyl content present in the combination of resin copolymer (A) and polydiorganosiloxane (B). A number of methods for determining silicon-bonded hydroxyl content exist, but results with polymers of the resin copolymer (A) type tend to be variable. Therefore it is better to include a sufficient excess of endblocking agent to provide at least a 10% excess (0.88:1 mole ratio for 0.8:1 mole ratio compositions) of endblocking triorganosilyl units to the silicon-bonded hydroxyl radicals. When the purpose is only to remove a substantial amount of the residual silicon-bonded hydroxyl content e.g., using a heating step to effect condensation of resin copolymer (A) with polydiorganosiloxane (B) in addition to endblocking, the minimum plus the aforementioned excess of endblocking agent is preferred.

When one desires to alter the properties of the pressure-sensitive adhesive by including endblocking agents with specific radicals, it is desirable to use a resin copolymer (A) that has a higher silicon-bonded hydroxyl content (e.g., 1–4 weight percent) so that more of the triorganosilyl units containing such radicals will be reacted into the condensation product of resin copolymer (A) and polydiorganosiloxane (B). Since condensation can also occur in the process of the present invention, inclusion of greater than the stoichiometric amount of endblocking triorganosilyl units relative to the silicon-bonded hydroxyl radicals and X radicals can affect the molecular weight of the condensation product which is the silicone pressure-sensitive adhesive. Use of more than a 1:3 mole ratio of total silicon-bonded hydroxyl radicals and X radicals present in resin copolymer (A) polydiorganosiloxane (B) to total endblocking triorganosilyl units provided by the endblocking agents added is believed to be excessive and wasteful.

Examples of endblocking agents are (Me$_3$Si)$_2$NH, (ViMe$_2$Si)$_2$NH, (MePhViSi)$_2$NH, (CF$_3$CH$_2$CH$_2$Me$_2$Si)$_2$NH, (ClCH$_2$Me$_2$Si)$_2$NH, Ph$_3$SiNH$_2$, (n-C$_3$H$_7$)$_3$SiNH$_2$, Me$_3$SiNH$_2$, MePhViSiNH$_2$, Me$_2$ViSiNH$_2$, CH$_3$C(O)OCH$_2$CH$_2$CH$_2$Me$_2$SiNH$_2$, CH$_3$COOCH$_2$Me$_2$SiNH$_2$, NCCH$_2$CH$_2$Me$_2$SiNH$_2$, HO(CH$_2$)$_4$Me$_2$SiNH$_2$, HOCH$_2$CH$_2$OCH$_2$Me$_2$SiNH$_2$, H$_2$N(CH$_2$)$_3$Me$_2$SiNH$_2$, H$_2$NCH$_2$CH$_2$NHCH$_2$CH$_2$CH$_2$SiNH$_2$, H$_2$N(CH$_2$)$_3$SiNH$_2$, CH$_3$CH$_2$CH$_2$S(CH$_2$)$_3$SiNH$_2$ and CH$_3$CH$_2$CH$_2$O(CH$_2$)$_3$SiNH$_2$.

Preferably, the endblocking agents employed are of the type (AR$_2$Si)$_2$NH such as (Me$_3$Si)$_2$NH or (ViMe$_2$Si)$_2$NH.

The above endblocking agents generate the silanol condensation catalyst ammonia when the triorganosilyl unit reacts with silicon-bonded hydroxyl radicals and/or X radicals present in the resin copolymer (A) and polydiorganosiloxanes (B). As will be further described, the condensation step (II) of the present invention is done with heating and the presence of the catalyst causes the condensation of the resin copolymer (A) and polydiorganosiloxanes (B) to take place at the same time that endblocking by the endblocking triorganosilyl units occurs. While the ammonia generated is volatile and much of it is eliminated during heating, it was noted that the silicone pressure-sensitive adhesive compositions made via the Blizzard and Swihart process using organosilazane endblocking agents had an ammonia odor and exhibited relatively low hold times. Although we do not want to limit the invention to a particular theory, this low hold time was thought to be due to the presence of residual ammonia in the composition.

The distinguishing feature of this invention over the Blizzard and Swihart invention is the use of water when ammonia releasing endblocking agents such as organosilazanes are used in the Blizzard and Swihart process to manufacture silicone pressure-sensitive adhesives. Use of water enables one to obtain hold times in excess of 24 hours, and, more preferably in excess of 30 hours. Some formulations showed hold times in excess of 80 hours at times. Use of increasing amounts of water generally improves hold time by removing more ammonia from the composition. Without the use of water in the process, the Blizzard and Swihart process using organosilazanes and organosilylamines generally gave lower hold times than those made with water.

Although not wishing to be bound by theory, the results shown in Example 3C appear to indicate that compositions of higher levels of resin copolymer which is the primary source of silicon-bonded hydroxyl content gave lower hold times as the level of water used was decreased. Ammonia, a polar compound, from the endblocking agent may tend to associate with polar silicon-bonded hydroxyl radicals present in the composition and may therefore become more difficult to remove as the level of silicon-bonded hydroxyl content is increased such as by increasing the amount of resin copolymer (A) or by increasing the level of silicon-bonded hydroxyl content in either or both of the resin copolymer (A) or polydiorganosiloxane (B).

The method of the present invention includes the incorporation of about 0.5 to 10 moles of water per mole of =NH provided by all endblocking agent (C) present in the composition. 0.5 moles of water would be an effective minimum with the use of at least 1.0 moles of water being more preferred and higher levels such as at least 3 moles of water per mole of =NH being preferred to obtain optimum levels of hold time and reduce the effect of silicon-bonded hydroxy radical level on hold time, particularly where the silicon-bonded hydroxyl content is from resin copolymer A. Use of more than about 10 moles of water per mole of =NH appears to be wasteful.

When necessary, an effective amount of an organic solvent can be added separately to the mixture of resin copolymer (A), polydiory anosiloxane (B), endblocking agent (C) and catalyst (D) to reduce the viscosity thereof or else can be present as a result of the fact that (A) and/or (B) was added as a solvent solution. The solvent should be inert with respect to (A), (B), (C) and (D) and not react with them during the condensation step. As noted earlier, resin copolymer (A) is often made as a solvent solution in toluene or xylene. Use of an organic solvent is often necessary when polydiorganosiloxane (B) is in the form of a high viscosity gum which results in a high viscosity mixture even when the mixture is heated to typical processing temperatures of 100°–150° C. Use of an organic solvent which permits azeotropic removal of water is preferred. The term "organic solvent" includes a single solvent such as benzene, toluene, xylene, trichloroethylene, perchloroethylene, ketones, halogenated hydrocarbons such as dichlorodifluoromethane, naphtha mineral spirits and mixtures of two or more organic solvents to form a blended organic solvent. Use of a ketone such as methylisobutyl ketone as at least a portion of the solvent is preferred when fluorinated radicals are present on a major amount of the siloxane units present in polydiorganosiloxane (B) for compatibility reasons. Preferably, the mixture contains a hydrocarbon solvent selected from the group consisting of benzene, toluene and xylene.

In accordance with the preferred method of the present invention, in Step (I) the resin copolymer (A) and polydiorganosiloxane (B), are mixed together with water (D), and any organic solvent (E) that is to be added. To accomplish effective removal of the ammonia generated by endblocking agent (C), the preferred method involves conducting the condensation reaction of (A), (B) and (C) with heating at 80° C. to 160° C. and, more preferably, under solvent reflux conditions. Thus, after (A), (B), (D), and (E), are mixed together, endblocking agent (C) is added to the mixture. The mixture is stirred at room temperature to insure that all ingredients are mixed well. To simplify the procedure, the water (D) is preferably added at the beginning of the procedure although, less preferably, it could be added at any point during the hereinafter-described condensation step (II) since the function of the water is to remove the ammonia from the pressure-sensitive adhesive composition being made. For example, the water (D) may also be added just prior to the hereinafter-described stripping step (III). This may require cooling of the mixture before the lower boiling water can be added which is less desirable than including the water (D) initially.

The condensation step (II) is begun when addition of endblocking agent (C) such a silazane is made at room temperature. Condensation continues when the mixture is heated from 80° C. to 160° C., preferably to the reflux temperature of the mixture. Condensation is preferably allowed to proceed at least until the rate of evolution of condensation by-products such as water is substantially constant. Heating is then continued until the desired physical properties such as viscosity, tack and adhesion values are obtained. Typically the mixture is allowed to reflux for an additional 1 to 4 hours after the beginning of the evolution of condensation by-products. At that point, the rate of evolution of such by-products has usually become substantially constant. Longer reflux times may be needed for compositions containing organofunctional radicals such as fluorinated radicals on the polydiorganosiloxane (B) or endblocking agent which are less compatible with those on the resin copolymer (A). During the condensation step, condensation by-products are at least periodically removed from the mixture such as by azeotropic removal of by-products or by removing some solvent periodically from the mixture.

When the condensation reaction is substantially complete, Step (III) is begun wherein the residual endblocking agent, water (D) and any remaining ammonia is solvent stripped away by removing excess solvent during or after the step (II) involving azeotropic removal of condensation by-products. Removal of solvent will carry away more volatile ingredients as part of the solvent or as separate ingredients which are carried with the solvent during stripping. The nonvolatile solids content of the resulting silicone pressure-sensitive adhesive composition can be adjusted by adding or removing solvent, the solvent present can be completely removed and a different organic solvent added to the silicone pressure-sensitive adhesive product, the solvent can be removed completely if the condensation product is sufficiently low in viscosity or else the mixture can be recovered and used as is. Presently, it is preferred to have the pressure-sensitive adhesive compositions in organic solvent solution wherein the organic solvent comprises from 30 to 70 weight percent of the total mixture of (A), (B), (C) and (E), particularly when the polydiorganosiloxane of (B) has a viscosity at 25° C. of greater than 100,000 centipoise.

The above procedure is preferred for compositions wherein the polydiorganosiloxanes (B) are greater than about 100,000 centipoise in viscosity at 25° C. When the viscosity of the polydiorganosiloxanes (B) are less than about 100,000 centipoise at 25° C., the physical properties of pressure-sensitive adhesives obtained therefrom are not always as high in tack and adhesion as may be desired and may also tend to result in adhesives possessing some adhesive transfer between substrates, see for example, the Pail Patent cited above.

For this reason, it is preferred that a precondensation step such as that employed in the Pail Patent be used in the process of the present invention prior to the condensation step in the presence of an endblocking agent (C) be used when a substantial amount of the polydiorganosiloxanes (B) have a viscosity of less than 100,000 centipoise at 25° C. In this case, Step (I) of the method of the present invention comprises the steps of (Ia) mixing resin copolymers (A), polydiorganosiloxanes (B) and any organic solvent (E) together in the presence of a silanol condensation catalyst such as ammonium carbonate, (Ib) condensing (A) and (B) to form a condensed product such as by heating under reflux conditions for 1 to 10 hours and (Ic) mixing the product of step (Ib) with (C), (D) and any further amount of organic solvent (E) which is necessary prior to proceeding with step (II) of the method of the present invention. The product of step (Ib) is thus increased in molecular weight by the precondensation step, but still contains residual silicon-bonded hydroxyl groups which are endblocked in accordance with the present method of the invention to result in an improved pressure sensitive adhesive composition. The resulting silicone pressure-sensitive adhesive composition is then processed according to Steps (II) and (III) and the solvent can be adjusted as described above to obtain a finished silicone pressure-sensitive adhesive composition.

The silicone pressure-sensitive adhesive compositions of the present invention can be used to prepare pressure-sensitive adhesive films as is in accordance with well-known techniques or else can, optionally, be further cured to increase the cross-link density of the adhesive film to improve the physical properties of the film, particularly the ability of the adhesive to maintain a bond at high temperature such as 350° F. This is desirable where the adhesive is to be used in industrial applications where high tack (e.g., >400 g/cm$^2$), adhesion (e.g., 1000 g/inch) and hold values are needed. Uncured adhesives generally do not have cohesive strengths which are as high as those exhibited by cured adhesives. To obtain good lap shear stability, the composition must be cured. In accordance with well-known procedures, about 0.5–3% by weight of a peroxide catalyst such as benzoyl peroxide or 2,4-dichlorobenzoyl peroxide based on adhesive solids can be added to the composition and the film can be cured at 110° C. to 200° C. for 1 to 10 minutes. The lap shear stability (hold time) can be increased to a certain extent by lengthening the cure time and/or increasing the level of catalyst employed. As is known in the art, excessive amounts of peroxide can have deleterious effects on adhesive properties. Other free radical cross-linking methods such as electron beam or actinic radiation may be useful in curing adhesive films, particularly when the silicone pressure-sensitive adhesive contains aliphatically unsaturated radicals such as vinyl radicals, when the resin copolymer (A) and/or the endblocking triorganosilyl units of (C) of the silicone pressure-sensitive adhesive contain aliphatically unsaturated radicals such as vinyl radicals, the adhesive can be cured at room temperature or by heating by using an ≡SiH bearing coreactant in conjunction with a chloroplatinic acid catalyst in the well-known manner.

Another particularly useful application for the silicone pressure-sensitive compositions of the present invention is the subject of a U.S. patent application Ser. No. 06/665,803 Virgil L. Metevia and John T. Woodard entitled "Transdermal Drug Delivery Devices with Amine-Resistant Silicone Adhesives" which is filed concurrently herewith and is assigned to the same assignee as is the present invention. That Metevia, et al. Application describes a transdermal drug delivery device for the controlled delivery of amino-functional drugs such as phenylpropanolamine. Silicone pressure-sensitive adhesives are very desirable for body contact use because they are permeable, moisture-resistant and are essentially hypoallergenic and non-irritating to the skin. Current silicone adhesives for such skin contact uses must possess low tack and adhesion value and contain silanol groups which are capable of being condensed by amines. As a result of contact with such drugs, the adhesive tends to dry out on storage and the adhesive will no longer adhere to the skin. Silicone pressure-sensitive adhesives made in accordance with the present invention are relatively insensitive to the effects of amines because a substantial proportion of the silicon-bonded hydroxyl radicals are endblocked and are very valuable as adhesives for such devices because of their stability towards the deleterious effects of amines on tack and adhesion values.

Other well-known ingredients such as fillers or pigments may be added to the silicone pressure-sensitive adhesives of the present invention provided that such materials do not adversely affect the adhesive properties of the compositions. It is also anticipated that cold blends of two or more silicone pressure-sensitive adhesive compositions may be made to obtain compositions having intermediate properties. For example, up to about 30 weight percent of a silicone pressure-sensitive adhesive composition having 70-90 parts of resin copolymer (A) and 10-30 parts of polydiorganosiloxane (A) having a high adhesion value (e.g., ~1300 g/inch) can be blended with 70-90 weight percent of a silicone pressure-sensitive adhesive composition of the present invention having 53 parts of resin copolymer (A) and 47 parts of polydiorganosiloxane (B) to improve the adhesion value of the silicone pressure-sensitive adhesive composition (all parts and percentages are by weight based on nonvolatile solids content). Although it is preferred that the additives be made in accordance with the present invention, in some applications it may be possible to employ less than about 30 weight percent of silicone pressure-sensitive adhesive containing some free silicon-bonded hydroxyl content, the less the better, without decreasing the stability of the silicone pressure-sensitive adhesives of the present invention to a large extent. The modifier need not be a pressure-sensitive adhesive and can comprise from 1 to 100 parts by weight of a copolymer (A) and 0 to 99 parts by weight of a polydiorganosiloxane (B).

Silicone pressure-sensitive adhesive compositions of the present invention can find use in applications where such adhesives have been used in the past such as in the manufacture of pressure-sensitive adhesive tapes, as pressure-sensitive adhesives for seaming fabrics and the like. When sufficiently compatible, they may be added to organic pressure-sensitive adhesives to change the properties of such adhesives. The stability of the adhesives of the present invention make them particularly desirable for use on tapes because the tack and adhesion properties remain reasonably constant with aging.

The following Examples are illustrative only and should not be construed as limiting the invention which is properly delineated in the appended claims. In the following Examples, all parts and percentages are by weight unless otherwise specified.

Quantitative tack measurements reported therein are performed through use of a POLYKEN TM brand Probe Tack Tester (Testing Machines, Inc., Amityville, NY). Briefly summarized, tack measurements, expressed in units of grams/cm$^2$ of tack, were obtained using a probe velocity of 0.5 cm/sec., a contact pressure of 100 grams/cm$^2$, and contact time of 0.5 seconds. Quantitative adhesion measurements reported therein were obtained through use of a one inch wide aluminum or MYLAR® tape which contained a 1.0 mil (or as reported in the Examples) layer of cured adhesive. The tape was adhered to a stainless steel panel and stripped at a rate of 12 inches/minute at an angle of 180°, with the results expressed in ounces (or grams) per inch. The adhesion test corresponds to ASTM D-1000.

Creep (high temperature lap shear stability) was determined according to Mil-T-81287, hereby incorporated by reference, wherein the pressure-sensitive adhesive is applied at a thickness of 1.5 mils (0.038 mm) to the full width of one inch wide strip of a KAPTON® polyimide resin film (E. I. duPont deNemours & Co., Wilmington, Delaware) for a distance of greater than 1 inch (2.54 cm) from the end and the pressure-sensitive adhesive is cured. The strip having the cured pressure-sensitive adhesive film is adhered to a strip of stainless steel in such a manner that there is a one square inch (6.45 cm$^2$) contact of adhesive with the stainless steel strip and are adhered with a force of a rolled 10 'lb (4.5 kg.) weight. The adhered strips are then fixed in a vertical orientation with the upper strip being secured and the lower strip bearing a 100 gram (g.) weight. The test is considered to be passed if less than a maximum slippage of ½ inch (1.27 cm) has occurred after heating the adhered strips over a 1 hour period to 500° F. and thereafter holding for 1 hour at 500° F.

Hold time was determined as follows. The pressure-sensitive adhesive was applied at a thickness of 1.5 mil (0.038 mm) to a ½ inch (12.7 mm) wide strip of MYLAR® (a trademark of E. I. DuPont de Nemours It. Co., Wilmington, Del.) polyester film having a thickness of 1 mil (0.025 mm) (or as reported in the Examples). After curing the pressure-sensitive adhesive, the strip was overlapped 1 inch (2.54 cm) on one end of a 1 inch (2.54 cm) wide stainless steel strip, pressed together with a 4.5 pound (2.0 kg) rolled weight and suspended vertically with the upper strip secured by its non-overlapped end and the lower strip bearing a 500 g. weight at its non-overlapped end. Examples 3A-3F used a one inch (2.54 cm) wide strip with a 975 g weight at the non-overlapped end. Hold time is the time elapsed before the strips part while being held in such a configuration in an oven at 350° F.

The nonvolatile solids content ("N.V.C.") of a material was determined by placing 1.5 g of the material in an aluminum foil dish, 60 mm in diameter and 15 mm deep, and heating the sample for 1 hour at 150° C. in an air-circulating oven. The heated sample was then cooled to room temperature and reweighed to determine the weight of the nonvolatile material (w). The N.V.C., in percent, is equal to 100* w/1.50. The N.V.C. of Resin A1 was determined by mixing 1.5 g. of the resin with 0.75 g. of a 100 centistoke viscosity trimethyl-siloxy-endblocked polydimethylsiloxane fluid in a weighing dish and heating for 2 hours at 150° C. as described above to obtain the N.V.C.

The silicon-bonded hydroxyl content was determined using a lithium aluminum hydride di-N-butyl amide titration based upon the one described by Kellum, et.al., and Chem. 39,1623 ff (1967), see also Jorden, and Chem. 30,297 (1964). material to a bromcresol purple endpoint using alcoholic KOH and is equal to the number of mg of KOH so used.

The viscosity of a material was determined at 25° C. with a Brookfield® Viscometer Model LVF using a #4 spindle and speed=6. Unless otherwise specified, all parts and percentages reported are in parts by weight. The following ingredients were used in the Examples:

Resin A-1: A xylene solution of a resinous copolymeric siloxane prepared from 45 parts of sodium silicate (41.6° Be) and 20 parts of Me$_3$SiCl according to the method of the Daudt, et al. patent noted above containing $Me_3SiO_{\frac{1}{2}}$ units and $SiO_{4/2}$ units in a ratio of approximately 0.75:1.0, and N.V.C. typically about 69–71%, an acid number in the range of 0.3 to 1.4, and a viscosity in the range of 10–14 centipoise at 25° C. at 60% N.V.C. in xylene solution, and a silicon-bonded hydroxyl content of about 2.5 weight percent based on a 100% N.V.C. Several different batches of this copolymer were used in the following examples.

Polydiorganosiloxane B-1 ("PDOS B-1"): A siloxane gum endblocked with silicon-bonded hydroxyl radicals having a viscosity of about 25,000,000 centipoise at 25° C. and a Williams Plasticity Value in the range of 54–60 mils (4.2 g. sample) at 90% N.V.C., silicon-bonded hydroxyl content of less than about 0.01% based on a 100% nonvolatile solids content. PDOS B-1 was prepared by reaction of 100 parts of a polydimethylsiloxane cyclic trimer with 0.40 parts of a hydroxy-endblocked polydimethylsiloxane fluid having a viscosity of 60–70 centistokes at 25° C. and 0.24 parts of a potassium silanolate catalyst.

EXAMPLE 1

This Example demonstrates the method of the present invention to produce a silicone pressure-sensitive adhesive.

Example 1A was prepared by charging 308 g Resin A-1 (68.9% N.V.C.), 209 g PDOS-B1 (~90% N.V.C.), 504 g xylene, and 7.2 g deionized water ("~" is approximately) to a 3-necked flask equipped with a stirring rod, thermometer, Dean-Stark trap with a water-cooled condenser and a heating mantle. The ingredients were stirred and 22 g hexamethyldisilazane was added to the stirring mixture which had a temperature of 30° C. After 15 minutes, the temperature of the contents of the flask was 31° C. and the contents of the flask was then heated to reflux temperature. Using 0 minutes as the start of heating, the temperature was 107° C. after 30 minutes and 4.0 ml condensation by product had been collected from the refluxing mixture. The mixture was maintained at reflux temperature and condensation by-products were removed from the Dean-Stark trap from time to time. The condensation of the contents of the flask was deemed to be substantially complete 135 minutes (temperature was 138° C.) after the start of heating (about 2 hours of reflux time) and stripping of solvent through the Dean-Stark trap was begun. After 15 minutes, the temperature of the contents of the flask had reached 143° C. and 319 g of solvent had been stripped from the contents of the flask. The heat was turned off and the silicone pressure-sensitive adhesive composition was cooled to room temperature. The resulting composition had an N.V.C. of 55.9% and an initial viscosity of 38,000 centipoise at 25° C. and after 6 months of room temperature storage, the viscosity was 65,000 centipoise. A 2.2 mil (0.056 mm) cured film of the above composition which had been catalyzed with 1% benzoyl peroxide (based on the N.V.C. of the composition) and cured for 15 minutes at room temperature followed by 5 minutes at 150° C. on a MYLAR® polyester substrate was found to have a tack value of 700 g/cm², an adhesion value of 1150 g/inch and had a hold time of greater than 30 hours. When 2% benzoyl peroxide was used, the tack value was 700 g/cm², the adhesion value was 1020 g/inch and the hold time was less than 1 hour.

This composition contained 2.9 moles of water per mole of =NH provided by the hexamethyldisilazane, and the endblocking agent provided about 87% of the stoichiometric amount of triorganosilyl units needed to react with the silicon-bonded hydroxyl radicals present in Resin A-1 (about 2.5% silicon-bonded hydroxyl content) and PDOS B-1 (silicon-bonded hydroxyl content assumed to be very small relative to that of Resin A-1).

Example 1A was made without the use of nitrogen sparging. In the following Example 1B, nitrogen sparging was used to determine if better removal of ammonia would result as evidenced by hold times in excess of 30 hours. Example 1B had the same formulation as Example 1A except tht 524 g xylene was used instead of 504 g xylene. The ingredients were then processed similar to Example 1A as follows: the hexamethyldisilazane was added to the other stirring ingredients at time 0 minutes (temperature was 30° C.) and an inert gas (nitrogen) purge was started. Heating was started at 31° C. after 15 minutes and the temperature was 63° C. after 30 minutes. After 45 minutes, (temperature was 114° C.) 4.6 ml of condensation by-product (water) was collected. After 60 minutes (temperature was 132° C.), 7.0 ml water was collected. After 135 minutes (temperature was 134° C.), a total of 7.8 ml of water had been collected and no further water was collected after 165 minutes (temperature was 134° C.) whereupon solvent stripping through the Dean-Stark trap was begun. A total of 316 g solvent was collected after 180 minutes (temperature was 138° C.) at which time stripping was terminated and the composition in the flask was cooled to room temperature. The resulting silicone pressure-sensitive adhesive composition had an N.V.C. of 56.1% and an initial viscosity of 36,600 centipoise. After 6 months of room temperature storage, the viscosity was 56,000 centipoise.

The composition was catalyzed and a cured film was made as in Example 1A. A 1.5 mil (0.038 mm) cured film of the composition of Example 1B catalyzed with 1% benzoyl peroxide had a tack value of 740 g/cm², an adhesion value of 1100 g/inch and had a hold time of 2 hours. A 2.0 mil (0.051 mm) cured film of the composition of Example 1B catalyzed with 2% benzoyl peroxide had a tack value of 790 g/cm², an adhesion value of 1020 g/cm² and a hold time of greater than 30 hours.

EXAMPLE 2

In this Example, compositions were made according to the method of the present invention by delaying addition of the water until later in the processing of the composition.

Example 2A had the same formulation as in Example 1A: 308 g Resin A-1 (68.9% N.V.C.), 209 g PDOS B-1 (~90% N.V.C.), 504 g xylene and 22 g hexamethyldisilazane. The ingredients were processed similar to Example 1A as follows: After the hexamethyldisilazane was added to the other mixed components (0 minutes, temperature was 29° C.), the mixture was allowed to stir until the heat was turned on after 15 minutes at a temperature of 31° C. Condensation by-product evolution was noted after 45 minutes at 123° C. A total of 1.8 g of condensation by-product had been collected in the Dean Stark trap after 150 minutes (temperature was 136° C.). At this point, 1.8 ml of condensation by-product was removed and the material in the flask was cooled. At 80° C. (180 minutes), 7.2 g of water were added to the flask and heating was resumed. After 255 minutes, the temperature was 63° C. After 300 minutes, the temperature was 65° C. The temperature was increased until water evolution was observed at 91° C. after 330 minutes. After 345 minutes (temperature was 120° C.), 5.2 ml water had been collected. After 360 minutes, the temperature was 135° C. and 7.0 ml of water was collected. After 435 minutes, the temperature was 135° C. and the amount of water collected was still 7.0 ml. At this point, xylene solvent was stripped by removing it from the Dean Stark trap. After 455 minutes (temperature was 139° C.), a total of 308 g solvent was removed, the stripping process was terminated and the composition in the flask was cooled. Nitrogen sparging was not used in this Example 2A. The resulting silicone pressure-sensitive adhesive composition has an N.V.C. of 56.0% and a viscosity of 25,800 centipoise. After 6 months of room temperature storage, the viscosity was 48,300 centipoise.

The composition was catalyzed and a cured film was made as in Example 1A. A 2.2 mil (0.056 mm) cured film of the composition of Example 2A catalyzed with 1% benzoyl peroxide had a tack value of 750 g/cm$^2$, an adhesion value of 1120 g/inch and had a hold time of 24 hours. A 2.2 mil (0.056 mm) cured film of the composition of Example 2A catalyzed with 2% benzoyl peroxide had a tack value of 600 g/cm$^2$, an adhesion value of 1060 g/inch and a hold time of greater than 30 hours.

In Example 2B, the same formulation was used as in Example 1B and processing was done in a manner similar to that of Example 1A with the following changes: The xylene, resin copolymer A-1 and PDOS B-1 were charged to a flask. Resin copolymer A-1 and PDOS B-1 were heated and allowed to condense for about 90 minutes at reflux temperature (132°–140° C.) at which time 2.3 g condensation by-product was collected. At that point, the contents of the flask was cooled to permit addition of the water (at 70° C.) followed by addition of the hexamethyldisilazane (at 40° C.). The mixture (at 30° C.) was then heated to reflux temperature. By-product evolution began at 100° C. and after 20 minutes the temperature was 138° C. The mixture was held at 138°–139° C. for 90 minutes at which time the evolution of condensation by-product was substantially constant. 243 g of solvent was stripped from the mixture over a 20 minute period and the composition was cooled to room temperature. The resulting composition had an N.V.C. of 55.2% and had an initial viscosity of 45,000 centipoise at 25° C. After five months of room temperature storage, the viscosity was 66,400 centipoise at 25° C.

The composition was catalyzed and a cured film was made as in Example 1A. A 0.9 mil (0.023 mm) cured film of the composition of Example 2B on MYLAR ® polyester substrate catalyzed with 2% benzoyl peroxide had a tack value of 560 g/cm$^2$, an adhesion value of 990 g/inch and had a hold time of greater than 30 hours. A 1.5 mil (0.038 mm) cured film of the composition of Example 2B on a MYLAR ® polyester film substrate catalyzed with 2% benzoyl peroxide had a tack value of 490 g/cm$^2$ and an adhesion value of 700 g/inch. When 2 samples were checked for resistance to creep and both samples failed: one sample exceeded the maximum amount of slippage between 10 and 15 minutes after 500° F. was reached and the other exceeded that maximum between 20 and 25 minutes after reaching 500° F.

As a comparative example, Example 2C was prepared in a manner similar to that of Example 2B using the same formulation, but no water was added during the process. The resulting composition had an N.V.C. of 53.7% and had an initial viscosity of 34,000 centipoise at 25° C. After five months of room temperature storage, the viscosity was 45,000 centipoise. A 1.6 mil (0.041 mm) cured film of Example 2C catalyzed with 2% benzoyl peroxide was cured on a MYLAR ® polyester film substrate as in Example 2B had a tack value of 500 g/cm$^2$, an adhesion value of 630 g/inch. The same results in resistance to creep testing were observed for both samples of Example 2C evaluated: one sample exceeded the maximum amount of slippage between 10 and 15 minutes after reaching 500° F. and the other exceeded that maximum between 20 and 25 minutes after reaching 500° F. Thus, neither Example 2B or 2C passed the resistance to creep test. The hold time of Example 2C was not evaluated.

EXAMPLE 3

In this Example, six pressure-sensitive adhesive compositions (Examples 3A–3F) were made using different levels of water in the formulation. Example 3G was a comparative example which was made without the use of any water and only a small amount of endblocking agent was added so that the amount of ammonia provided by the endblocking agent was only 36% of that present in Examples 3A–3F. Examples 3A–3F were prepared as in Example 1A as follows. All ingredients except the hexamethyldisilazane ("HMDS" in Table I) was charged to a flask, and stirred well. The hexamethyldisilazane was added and the mixture was stirred for 15 minutes before heating was commenced. The contents of the flask were heated to the point at which condensation by-product evolution began and reflux commenced (124–138° C.) over a 30 to 75 minute period of time. The contents were held at reflux temperature for about 2½ to 3¼ hours with removal of condensation by-products through the Dean-Stark trap and then 145–175 g solvent was stripped out through the Dean-Stark trap over a 20 minute period. Example 3G was made as above except the heating time to reflux was 30 minutes, the reflux time was 105 minutes and 318 g of solvent was stripped at the end of the reflux period over a 20 minute period. The contents of the flask were cooled and films of each composition were tested for tack, adhesion and hold time after being catalyzed and cured as in Example 1A. In some cases, duplicate samples were tested for hold time. The results are reported in Table II.

In Examples, 3A–3F, hold time generally increased with an increase in curing catalyst while the tack and adhesion properties remained substantially the same or decreased slightly. At 1% benzoyl peroxide, Examples 3A–3F all exhibited very low hold times while at a level of 2% benzoyl peroxide, Examples 3A, 3B and 3D each exhibited greater than 24 hours of hold time with one sample of Example 3A exceeding 240 hours. One sample in Example 3F had a hold time of 24 hours. Example 3E had low hold times for both levels of catalyst, but this appears to be in contradiction to the results obtained for Example 3B which contained one third of the amount of water used in Example 3E (Example 3B had greater than 24 hours of hold time) and those obtained for Example 1A and 1B which contained about the same level of water. Examples 3A and 3B were also evaluated for resistance to creep using cured compositions catalyzed with 2% benzoyl peroxide. Both samples passed the resistance to creep test. A composition was made as in Example 3C which only contained a 1.0/1 molar ratio of water to =NH from the hexamethyldisilazane; it failed the resistance to creep test when cured after being catalyzed with 2% benzoyl peroxide.

Example 3C exhibited low hold time and only one sample for Example 3F had 24 hours of hold time. These two examples contained the highest level of Resin A-1 which is the prime source of silicon-bonded hydroxyl groups in the compositions. Comparing the good hold time results obtained for Examples 3A and 3D which contained the lowest level of Resin A-1 to that for Examples 3C and 3F, it would appear that greater amounts of water are needed as the level of resin copolymer (or silicon-bonded hydroxy radical content thereof) is increased. Example 3F contained 50% more water than Example 3C and showed an increase in hold time relative to Example 3C.

It appears that ammonia may be more strongly retained in compositions containing higher levels of resin copolymer A-1 due to the increased level of silicon-bonded hydroxyl radicals present (this would also appear to be true where compositions containing lower molecular weight polydiorganosiloxanes containing a higher level silicon-bonded hydroxyl radicals than PDOS B-1 are employed) and more water appears to be necessary to improve the hold time in such cases.

Comparative Example 3G had less than 22 hours of hold time even though much less endblocking agent was used (and ammonia generated) than in the other Examples 3A–3F. The hold time in Examples 3A–3F was evaluated as described previously using a one inch (25 mm) wide strip of MYLAR ® polyester film with a 975 g weight suspended from one end of the non-overlapped strip while Example 3G was evaluated as described previously using a ½ inch wide (12.7 mm) strip of MYLAR ® polyester with a 500 g weight suspended from the non-overlapped end.

(B) from 30 to 60 parts by weight of at least one polydiorganosiloxane consisting essentially of ARSiO units terminated with endblocking TRASiO$_{\frac{1}{2}}$ units, each said polydiorganosilozane having a viscosity of from 100 centipoise to 30,000,000 centipoise at 25° C., and each T is R— or X—, (C) a sufficient amount of at least one organosilicon endblocking agent capable of generating an endblocking triorganosilyl unit of the formula ZR$_2$Si— to provide a 1:0.8 to 1:3 mole ratio of total silicon-bonded hydroxyl and X radicals present in said (A) and (B) to total endblocking triorganosilyl units provided by all endblocking agent present, said agent being selected from the group consisting of ZR$_2$SiNH$_2$ and (ZR$_2$Si)$_2$NH, (D) from 0.5 to 10 moles of water per mole of =NH provided by said (C), and (E) optionally, an effective amount of an organic solvent which is inert with respect to (A), (B), (C) and (D) to reduce the viscosity of a mixture of (A), (B), and (C), (II) condensing (A), (B) and (C) at a temperature of from 80° C. to 160° C. and at the same time at least periodically removing any condensation by-products from the mixture at least until a substantial amount of the endblocking triorganosilyl units have reacted with the silicon-bonded hydroxyl radicals and X radicals of said (A) and (B), and (III) stripping substantially any remaining condensa-

TABLE I

| Ex. | Resin A1 (g) | PDOS B1 (g) | Xylene (g) | HMDS (g) | Water (g) | R-A1/P-B1[1] | EB/=SiOH[2] | Water/=NH[3] | N.V.C. | VISC.[4] |
|---|---|---|---|---|---|---|---|---|---|---|
| 3A | 124.4 | 118.5 | 245.2 | 10.7 | 1.2 | 45/55 | 103.0 | 1.0/1 | 54.3 | 49500 |
| 3B | 146.4 | 101.5 | 240.1 | 10.7 | 1.2 | 53/47 | 87.8 | 1.0/1 | 56.2 | 29500 |
| 3C | 106.5 | 90.6 | 237.0 | 10.7 | 2.3 | 58/42 | 80.0 | 1.9/1 | 54.8 | 15000 |
| 3D | 124.4 | 118.5 | 245.2 | 10.7 | 3.6 | 45/55 | 103.0 | 3.0/1 | 53.6 | 29500 |
| 3E | 146.4 | 101.5 | 240.1 | 10.7 | 3.6 | 53/47 | 87.8 | 3.0/1 | 54.0 | 23500 |
| 3F | 160.5 | 90.6 | 237 | 10.7 | 3.6 | 58/42 | 80.0 | 3.0/1 | 53.7 | 32000 |
| 3G | 308.0 | 209.0 | 504 | 8 | 0.0 | 53/47 | 31.0 | 0/1 | 54.3 | 27500 |

[1]Parts Resin A-1 to parts PDOS B-1 based on 100% N.V.C.
[2]Moles (CH$_3$)$_3$Si— supplied by HMDS ("EB") divided by moles —OH present in Resin A-1 and PDOS B-1 assuming Resin A-1 had 2.5% —OH content and PDOS B-1 had negligible —OH content.
[3]Moles of water added divided by moles of =NH provided by HMDS.
[4]Initial viscosity in centipoise at 25° C.

TABLE II

| | 1% Benzoyl Peroxide Catalyst | | | | 2% Benzoyl Peroxide Catalyst | | | |
|---|---|---|---|---|---|---|---|---|
| Ex | Film[1] | Tack (g/cm$^2$) | Adhesion (g/inch) | Hold (hours) | Film[1] | Tack (g/cm$^2$) | Adhesion (g/inch) | Hold (hours) |
| 3A | 1.4 | 480 | 630 | <3/<1 | 2.4 | 480 | 660 | >24/>240 |
| 3B | 1.2 | 660 | 1000 | <3 | 1.3 | 570 | 830 | >24 |
| 3C | 1.7 | 720 | 1300 | <3/<1 | 1.3 | 530 | 1280 | <3/<3 |
| 3D | 2.0 | 440 | 650 | <3/<1 | 1.2 | 480 | 610 | >24/>24 |
| 3E | 1.2 | 780 | 1070 | <3/<1 | 1.3 | 690 | 930 | <3/<3 |
| 3F | 1.2 | 670 | 1250 | <3/<1 | 1.4 | 670 | 1300 | 24/<6 |
| 3G | 2.2 | 670 | 1180 | <22 | 2.2 | 690 | 1090 | <1 |

[1]Film thickness in mils where 1 mil = 0.001 inch = 0.025 mm.

That which is claimed is:

1. A method of making a silicone pressure-sensitive adhesive composition having improved lap shear stability which consists essentially of the steps of:
(I) mixing
(A) from 40 to 70 inclusive parts by weight of at least one benzene-soluble resin copolymer containing silicon-bonded hydroxyl radicals and consisting essentially of R$_3$SiO$_{\frac{1}{2}}$ units and SiO$_{4/2}$ units in a mole ratio of from 0.6 to 0.9 R$_3$SiO$_{\frac{1}{2}}$ units for each SiO$_{4/2}$ unit present, tion by-products and (D) from the mixture after the condensation reaction of step II is substantially complete,
wherein each R is a monovalent organic radical selected from the group consisting of hydrocarbon radicals of from 1 to 6 inclusive carbon atoms, each X radical is selected from the group consisting of HO—, H— and R'O— radicals, each R' is an alkyl radical of from 1 to 4 inclusive carbon atoms, each A radical is selected from the group consisting of R— and halohydrocarbon radicals of from 1 to 6 inclusive carbon atoms, each Z radical is A— or QR"—, each R" is a divalent alkylene radical of from 1 to 6 inclusive carbon atoms, each Q is an organofunctional monovalent radical selected from the group consisting of RCOE'—, RE'OC—, NC—, R'E'—, HO—, G$_2$N—, HO(R"O)$_n$— where E' is —O—, —NH— or —S— where n has a value of from 1 to 6 and each G is R'— or H—.

2. The method as claimed in claim 1 wherein (D) is at least 1 mole of water per mole of =NH provided by said (C) and Z is A.

3. The method as claimed in claim 2 wherein said R$_3$SiO$_{\frac{1}{2}}$ units present in said copolymer of (A) are (CH$_3$)$_2$R'''SiO$_{\frac{1}{2}}$ units wherein each R''' is selected from the group consisting of methyl, vinyl, and phenyl radicals, said ARSiO units of (B) are selected from the group consisting of R'''$_2$SiO units, (C$_6$H$_5$)$_2$SiO units and combinations of both, said TRASiO$_{\frac{1}{2}}$ endblocking units of (B) being of the unit formula (HO)R'''CH$_3$SiO$_{\frac{1}{2}}$, at least 50 mole percent of the R''' radicals present in said (B) being methyl radicals and no more than 50 mole percent of the total moles of ARSiO units present in each polydiorganosiloxane of said (B) are (C$_6$H$_5$)$_2$SiO units, each R present in said endblocking agent (C) is selected from the group consisting of methyl and phenyl radicals and Z is selected from the group consisting of methyl, vinyl and 3,3,3-trifluoropropyl radicals, wherein (A) is free of aliphatically unsaturated radicals when (B) contains such radicals and (B) is free of aliphatically unsaturated radicals when (A) contains such radical, and the condensation step (II) is conducted at least until the rate of evolution of condensation reaction by-products is substantially constant.

4. The method as claimed in claim 3 wherein the mixture prepared in Step I further contains a hydrocarbon solvent selected from the group consisting of benzene, toluene and xylene and the condensation reaction of Step II is conducted under solvent reflux conditions to effect removal of said condensation by-products.

5. The method as claimed in claim 4 wherein no more than 10 mole percent of the R$_3$SiO$_{\frac{1}{2}}$ units present in said (A) are (CH$_3$)$_2$R''''SiO$_{\frac{1}{2}}$ units, the remaining R$_3$SiO$_{\frac{1}{2}}$ units are (CH$_3$)$_3$SiO$_{\frac{1}{2}}$ units, said R'''' radicals being methyl or vinyl radicals, and no more than 10 mole percent of said ARSiO units of (B) being of the unit formula CH$_3$R''''SiO and the remaining ARSiO units present in said (B) are (CH$_3$)$_2$SiO units, each Z is a methyl or vinyl radical, the amount of said (A) being in the range of from 45 to 60 inclusive parts by weight, and the amount of said (B) being in the range of 40 to 55 inclusive parts by weight.

6. The method as claimed in claim 4 wherein the polydiorganosiloxane of (B) has a viscosity at 25° C. of greater than 100,000 centipoise, the solvent being present in an amount which is such that the solvent comprises from 30 to 70 weight percent of the total weight of the mixture of (A), (B), (C), and (F).

7. The method as claimed in claim 3 wherein the endblocking agent is (AR$_2$Si)$_2$NH and (D) is at least 1 mole of water per mole of =NH provided by said (C).

8. The method as claimed in claim 5 wherein the endblocking agent is (AR$_2$Si)$_2$NH and (D) is at least 1 mole of water per mole of =NH provided by said (C).

9. The method as claimed in claim 6 wherein the endblocking agent is (AR$_2$Si)$_2$NH and each A is a methyl or vinyl radical and (D) is at least 1 mole of water per mole of =NH provided by said (C).

10. The method as claimed in claim 1 wherein Step (I) comprises the Steps of (Ia) mixing (A), (B) and any (E) together, (Ib) condensing said (A) and (B) to form a condensed product and (Ic) mixing the product of Step (Ib) with (C), (D) and any further amount of (E) which is necessary prior to proceeding with Step (II), said polydiorganosiloxane of (B) having a viscosity of from 100 to 100,000 centipoise at 25° C.

11. The method as claimed in claim 3 wherein Step (I) comprises the Steps of (Ia) mixing (A), (B) and any (E) together, (Ib) condensing said (A) and (B) to form a condensed product and (Ic) mixing the product of Step (Ib) with (C), (D) and any further amount of (E) which is necessary prior to proceeding with Step (II), said polydiorganosiloxane of (B) having a viscosity of from 100 to 100,000 centipoise at 25° C.

12. The method as claimed in claim 5 wherein Step (I) comprises the Steps of (Ia) mixing (A), (B) and any (E) together, (Ib) condensing said (A) and (B) to form a condensed product and (Ic) mixing the product of Step (Ib) with (C), (D) and any further amount of (E) which is necessary prior to proceeding with Step (II), said polydiorganosiloxane of (B) having a viscosity of from 100 to 100,000 centipoise at 25° C.

13. The method as claimed in claim 1 wherein Step (I) comprises the steps of (Ia) mixing (A), (B) and any (E) together, (Ib) adding said (C) to the mixture formed in step (Ia) to form a reaction mixture and (Ic) adding said (D) to the reaction mixture at a preselected point during said Step (II) prior to commencing Step (III).

14. The method as claimed in claim 3 wherein Step (I) comprises the steps of (Ia) mixing (A), (B) and any (E) together, (Ib) adding said (C) to the mixture formed in Step (Ia) to form a reaction mixture and (Ic) adding said (D) to the reaction mixture at a preselected point during said Step (IB) prior to commencing Step (III).

15. A pressure-sensitive adhesive composition comprising the product obtained from the method of claim 1.

16. A pressure-sensitive adhesive composition comprising the product obtained from the method of claim 2.

17. A pressure-sensitive adhesive composition comprising the product obtained from the method of claim 3.

18. A pressure-sensitive adhesive composition comprising the product obtained from the method of claim 4.

19. A pressure-sensitive adhesive composition comprising the product obtained from the method of claim 5.

20. A pressure-sensitive adhesive composition comprising the product obtained from the method of claim 6.

21. A pressure-sensitive adhesive composition comprising the product obtained from the method of claim 7.

22. A pressure-sensitive adhesive composition comprising the product obtained from the method of claim 8.

23. A pressure-sensitive adhesive composition comprising the product obtained from the method of claim 9.

24. A pressure-sensitive adhesive composition comprising the product obtained from the method of claim 10.

25. A pressure-sensitive adhesive composition comprising the product obtained from the method of claim 11.

26. A pressure-sensitive adhesive composition comprising the product obtained from the method of claim 12.

27. A pressure-sensitive adhesive composition comprising the product obtained from the method of claim 13.

28. A pressure-sensitive adhesive composition comprising the product obtained from the method of claim 14.

29. A pressure-sensitive adhesive composition comprising a blend of the product obtained from the method of claim 1 with less than about 30 weight percent based on nonvolatile solids content of a modifier comprising from 1 to 100 parts by weight of a silicone resin copolymer consisting essentially of $R_3SiO_{\frac{1}{2}}$ units and $SiO_{4/2}$ units in a mole ratio of from 0.6 to 0.9 $R_3SiO_{\frac{1}{2}}$ units for each $SiO_{4/2}$ unit present and from 0 to 99 parts by weight of at least one polydiorganosiloxane consisting essentially of ARSiO units terminated with endblocking $TRASiO_{\frac{1}{2}}$ units, each said polydiorganosiloxane having a viscosity of from 100 centipoise to 30,000,000 centipoise at 25° C.

30. A pressure-sensitive adhesive composition comprising a blend of the product obtained from the method of claim 3 with less than about 30 weight percent based on nonvolatile solids content of a modifier comprising from 1 to 100 parts by weight of a silicone resin copolymer consisting essentially of $R_3SiO_{\frac{1}{2}}$ units and $SiO_{4/2}$ units in a mole ratio of from 0.6 to 0.9 $R_3SiO_{\frac{1}{2}}$ units for each $SiO_{4/2}$ unit present and from 0 to 99 parts by weight of at least one polydiorganosiloxane consisting essentially of ARSiO units terminated with endblocking $TRASiO_{\frac{1}{2}}$ units, each said polydiorganosiloxane having a viscosity of from 100 centipoise to 30,000,000 centipoise at 25° C.

31. A pressure-sensitive adhesive composition comprising a blend of the product obtained from the method of claim 5 with less than about 30 weight percent based on nonvolatile solids content of a modifier comprising from 1 to 100 parts by weight of a silicone resin copolymer consisting essentially of $R_3SiO_{\frac{1}{2}}$ units and $SiO_{4/2}$ units in a mole ratio of from 0.6 to 0.9 $R_3SiO_{\frac{1}{2}}$ units for each $SiO_{4/2}$ unit present and from 0 to 99 parts by weight of at least one polydiorganosiloxane consisting essentially of ARSiO units terminated with endblocking $TRASiO_{\frac{1}{2}}$ units, each said polydiorganosiloxane having a viscosity of from 100 centipoise to 30,000,000 centipoise at 25° C.

32. A pressure-sensitive adhesive composition comprising a blend of the product obtained from the method of claim 6 with less than about 30 weight percent based on nonvolatile solids content of a modifier comprising from 1 to 100 parts by weight of a silicone resin copolymer consisting essentially of $R_3SiO_{\frac{1}{2}}$ units and $SiO_{4/2}$ units in a mole ratio of from 0.6 to 0.9 $R_3SiO_{\frac{1}{2}}$ units for each $SiO_{4/2}$ unit present and from 0 to 99 parts by weight of at least one polydiorganosiloxane consisting essentially of ARSiO units terminated with endblocking $TRASiO_{\frac{1}{2}}$ units, each said polydiorganosiloxane having a viscosity of from 100 centipoise to 30,000,000 centipoise at 25° C.

33. The method as claimed in claim 1 wherein said (D) is at least 3 moles of water per mole of =NH provided by said (C).

34. A pressure-sensitive adhesive composition comprising the product obtained from the method of claim 33.

35. The method as claimed in claim 5 wherein Step (I) comprises the steps of (Ia) mixing (A), (B) and any (E) together, (Ib) adding said (C) to the mixture formed in Step (Ia) to form a reaction mixture and (Ic) adding said (D) to the reaction mixture at a preselected point during said Step (IB) prior to commencing Step (III).

36. A pressure-sensitive adhesive composition comprising the product obtained from the method of claim 35.

* * * * *